United States Patent
Summers et al.

(10) Patent No.: US 9,857,272 B2
(45) Date of Patent: Jan. 2, 2018

(54) SYSTEMS AND METHODS FOR DETECTING WHEEL BEARING WEAR WITH MOUNTED ACCELEROMETERS

(71) Applicant: GOODRICH CORPORATION, Charlotte, NC (US)

(72) Inventors: Paul Summers, Troy, OH (US); Steven Keller, Union, OH (US); Todd Rook, Tipp City, OH (US); Michael Kordik, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 148 days.

(21) Appl. No.: 14/611,809

(22) Filed: Feb. 2, 2015

(65) Prior Publication Data
US 2016/0223431 A1 Aug. 4, 2016

(51) Int. Cl.
| | | |
|---|---|---|
| *G01M 17/013* | (2006.01) | |
| *B64C 25/36* | (2006.01) | |
| *F16C 19/52* | (2006.01) | |
| *F16C 41/00* | (2006.01) | |
| *G01M 13/04* | (2006.01) | |
| *F16C 19/36* | (2006.01) | |

(52) U.S. Cl.
CPC ........... *G01M 13/045* (2013.01); *B64C 25/36* (2013.01); *F16C 19/527* (2013.01); *F16C 41/008* (2013.01); *G01M 17/013* (2013.01); *F16C 19/364* (2013.01); *F16C 2326/02* (2013.01); *F16C 2326/43* (2013.01)

(58) Field of Classification Search
CPC ... G01M 17/013; G01M 13/045; B64C 25/36; F16C 19/527; F16C 19/361; F16C 41/008; F16C 2326/05; F16C 2326/43
USPC .......................................................... 73/593
See application file for complete search history.

(56) References Cited

U.S. PATENT DOCUMENTS

| | | | | |
|---|---|---|---|---|
| 4,010,637 A | * | 3/1977 | Harwell | G01P 15/0891 700/279 |
| 4,612,620 A | * | 9/1986 | Davis | G01H 1/00 702/184 |
| 5,852,793 A | * | 12/1998 | Board | G01H 1/003 702/183 |

(Continued)

FOREIGN PATENT DOCUMENTS

| | | | |
|---|---|---|---|
| CN | 202119630 | * | 1/2012 |
| DE | 102011088746 | | 6/2013 |

(Continued)

OTHER PUBLICATIONS

Extended European Search Report dated Jun. 14, 2016 in European Application No. 16153773.3.

(Continued)

*Primary Examiner* — J M Saint Surin
(74) *Attorney, Agent, or Firm* — Snell & Wilmer L.L.P.

(57) ABSTRACT

A wheel monitoring system comprising a wheel, a bearing mechanically coupled to the wheel, an axle mechanically coupled to the bearing, and a wheel speed transducer (WST) disposed in the axle. The WST may be configured to detect vibrations. A method of monitoring a bearing is also provided and may comprise measuring a vibration of the bearing, comparing the vibration of the bearing to a predetermined vibration, and estimating a remaining useful life of the bearing.

11 Claims, 7 Drawing Sheets

(56) References Cited

U.S. PATENT DOCUMENTS

| | | | | |
|---|---|---|---|---|
| 5,983,165 | A * | 11/1999 | Minnich | E01C 23/04 |
| | | | | 404/115 |
| 6,266,586 | B1 | 7/2001 | Gagnon | |
| 9,574,965 | B2 * | 2/2017 | Furman | G01M 1/28 |
| 2004/0075022 | A1 | 4/2004 | Mackness | |
| 2004/0199313 | A1 * | 10/2004 | Dellinger | B60G 17/015 |
| | | | | 701/37 |
| 2006/0096354 | A1 * | 5/2006 | Commuri | E01C 19/288 |
| | | | | 73/32 A |
| 2006/0222278 | A1 * | 10/2006 | Singh | F01D 17/02 |
| | | | | 384/448 |
| 2008/0033607 | A1 * | 2/2008 | Zeliff | B64D 45/0005 |
| | | | | 701/31.4 |
| 2008/0168823 | A1 * | 7/2008 | Maassen | G01N 3/56 |
| | | | | 73/7 |
| 2011/0301873 | A1 * | 12/2011 | Cocconcelli | G01M 13/04 |
| | | | | 702/35 |
| 2014/0167810 | A1 * | 6/2014 | Neti | G01R 31/34 |
| | | | | 324/765.01 |

FOREIGN PATENT DOCUMENTS

| | | | |
|---|---|---|---|
| EP | 2581724 | | 4/2013 |
| JP | 401057115 | * | 3/1989 |
| JP | 401057115 A | * | 3/1989 |
| WO | 2013146501 | | 10/2013 |

OTHER PUBLICATIONS

Invitation Pursuant to Article 94(3) and Rule 71(1) EPC dated Mar. 2, 2017.

* cited by examiner

SYSTEMS AND METHODS FOR DETECTING WHEEL BEARING WEAR WITH MOUNTED ACCELEROMETERS

FIELD OF INVENTION

The present disclosure relates to aircraft wheel bearings, and, more specifically, to systems and methods of monitoring wheel bearing wear.

BACKGROUND

Aircraft wheels may use tapered roller bearings to enable wheels to roll smoothly. The typical wheel bearing may have a life span that is shorter than the life of the aircraft. Thus, bearings may be replaced from time to time. Visual inspections may be performed to evaluate whether a bearing may be ready for replacement. However, complete replacement of the bearing may cause slight damage to the wheel as a portion of the bearing may be press fit into the wheel. Thus, after a limited number of bearing replacement, the damage to the wheel may dictate that the wheel be replaced as well.

One obstacle to preventative bearing maintenance is human error and consistency. Visual inspection quality may vary by the inspector or process used. Additionally, some replacement bearings may be misaligned upon reassembly. If misalignment goes undetected, a bearing failure may result. Bearings may fail due to corrosion, spalling, misalignment, foreign materials, handling damage, brinelling, lubrication, or excessive load. If bearing failure does occur, it also may result in permanent damage to the wheel or axle. In some instances, wheels may detach from the axle and aircraft. In the field, undetected wheel-bearing failures frequently dictate a high-cost replacement of the wheel and axle.

SUMMARY

A wheel monitoring system comprising a wheel, a bearing mechanically coupled to the wheel, an axle mechanically coupled to the bearing, and a vibration monitoring device disposed in the axle. The vibration monitoring device may be configured to detect vibrations.

In various embodiments, the vibration monitoring device may comprise an accelerometer configured to detect the vibrations. The vibration monitoring device may also comprise a wheel speed transducer (WST). A non-transitory memory may communicate with a controller, the non-transitory memory having instructions stored thereon that, in response to execution by the controller, cause the controller to perform operations. The operations may include measuring the vibrations using the WST and determining a remaining useful life for the bearing in response to the vibrations measured. The operations may further comprise signaling a maintenance event in response to the remaining useful life for the bearing. The operations may also comprise measuring a temperature of the bearing, and signaling a maintenance event in response to the temperature of the bearing. A maintenance event may be signaled by providing a visual indicator in a cockpit or on a maintenance device such as a handheld device or terminal, for example. The operations may further comprise outputting the remaining useful life of the bearing. The operations further comprise measuring an amplitude of the vibrations at a predetermined frequency.

A method of monitoring a bearing may comprise measuring a vibration of the bearing, comparing the vibration of the bearing to a predetermined value or spectra, and estimating a remaining useful life of the bearing.

In various embodiments, the method may include measuring the vibration of the bearing may further include measuring an amplitude at a predetermined frequency. The amplitude at the predetermined frequency may be compared to a baseline amplitude at the predetermined frequency. The baseline amplitude at the predetermined frequency may be representative of a spent bearing. The method may further include signaling a maintenance event in response to the amplitude at the predetermined frequency exceeding a threshold value. A temperature of the bearing may be measured. Measuring the vibration of the bearing may comprise measuring the vibration of the bearing using an accelerometer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
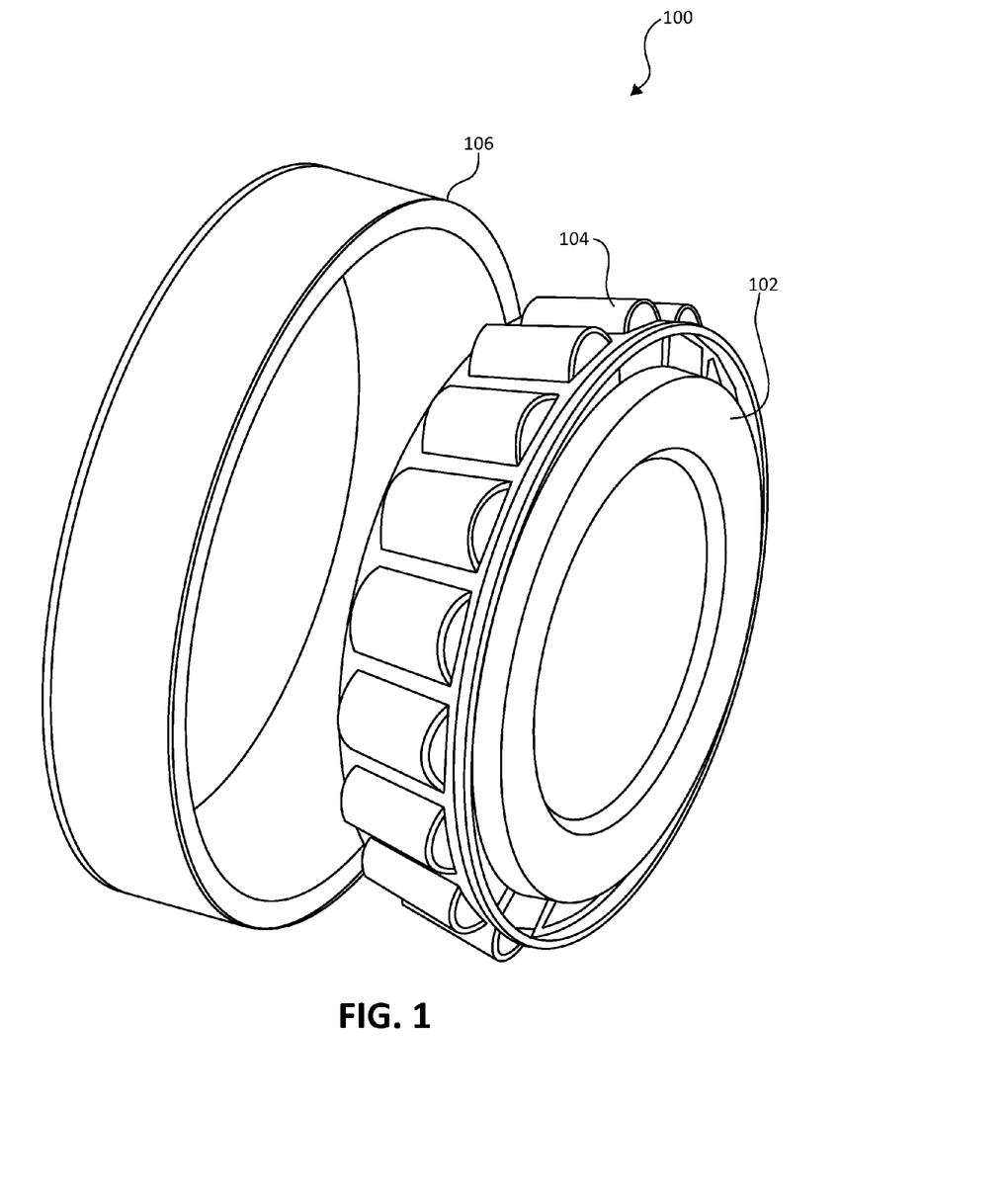
FIG. 1 illustrates a wheel bearing for an aircraft wheel, in accordance with various embodiments.

With reference to FIG. 1, a wheel bearing 100 is shown according to various embodiments. Wheel bearing 100 may include cone 102 with rollers 104. Cone 102 may press into cup 106 to provide low-resistance rotation for a wheel, for example. When wheel bearing 100 is new (i.e., not worn) the wheel bearing may exhibit a certain vibration profile, discussed in further detail below. As the bearing wears over the course of its service life, the vibration profile may change over time. Vibrations exhibiting various amplitudes at various frequencies may indicate that a bearing has reached the end of its service life and should be replaced.

Figure 2:
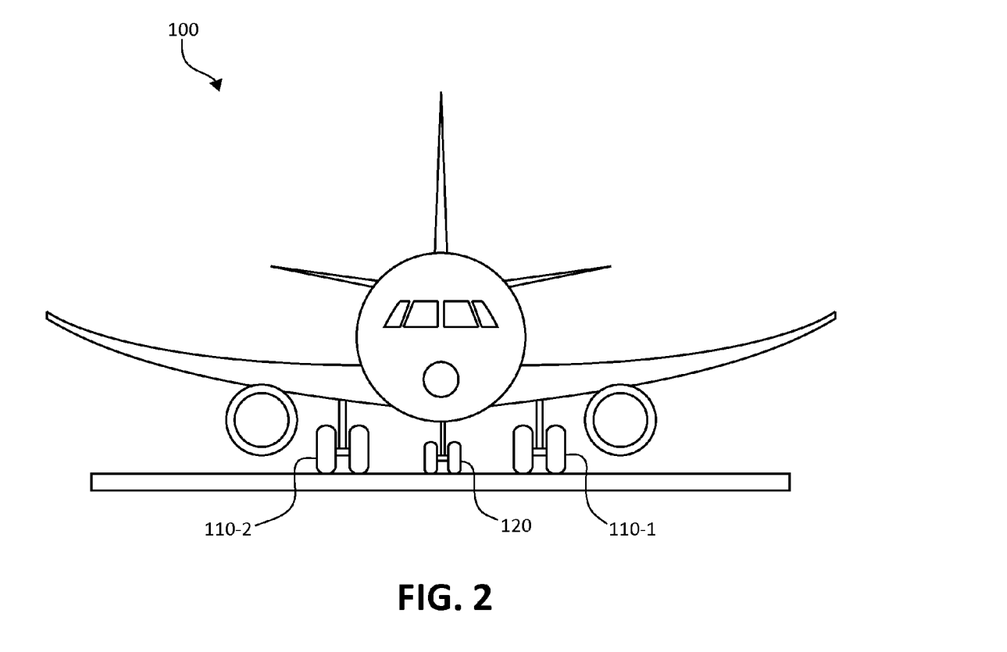
FIG. 2 illustrates an aircraft on the ground, in accordance with various embodiments.

In various embodiments and with reference to FIG. 2, an aircraft 108 may comprise a landing gear system including a first main landing gear 110-1, a second main landing gear 110-2, and a nose landing gear 120. Nose landing gear 120 may be installed in a forward portion of the aircraft fuselage (e.g., forward of the engines) at the nose of the fuselage. First main landing gear 110-1 and second main landing gear 110-2 may be installed aft of nose landing gear 120. First main landing gear 110-1, second main landing gear 110-2, and nose landing gear 120 may generally support the aircraft when it is not flying, allowing the aircraft to take off, land, and taxi without damage. Each of the landing gear may comprise one or more wheel bearing 100 as illustrated in FIG. 1.

Figure 3:
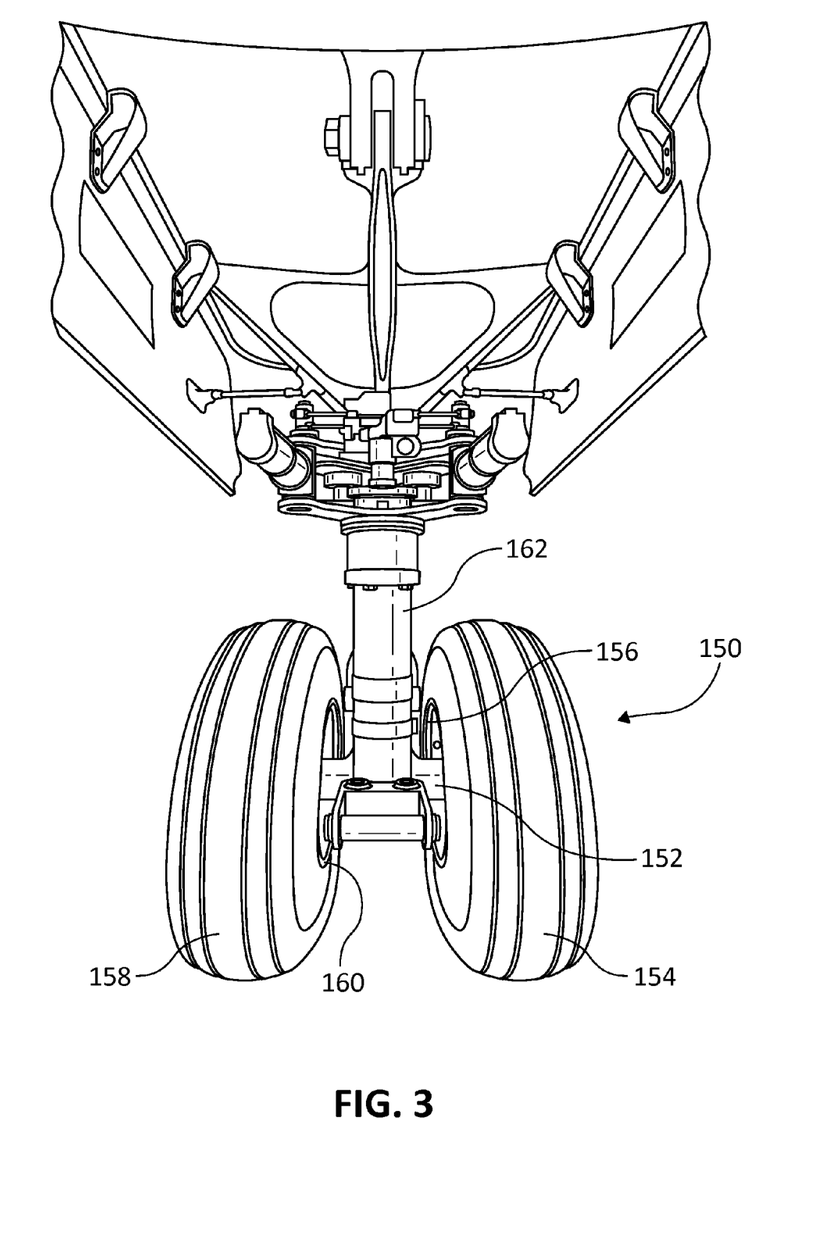
FIG. 3 illustrates a landing gear assembly on an aircraft, in accordance with various embodiments.

In various embodiments and with reference to FIG. 3, nose landing gear 150 may comprise a first wheel 156 and a second wheel 160 coupled to landing gear strut 162. First wheel 156 may be operatively coupled to a tire 154. In this regard, tire 154 may be mounted on first wheel 156. Tire 154 may define a pressurizable chamber between tire 154 and first wheel 156. Similarly, a tire 158 may be mounted on and/or coupled to second wheel 160. First wheel 156 and second wheel 160 may operatively couple to and/or rotatably couple to an axle assembly 152 with a wheel bearing 100 as illustrated in FIG. 1. Axle assembly 152 may operatively couple to landing gear strut 162.

Figure 4:
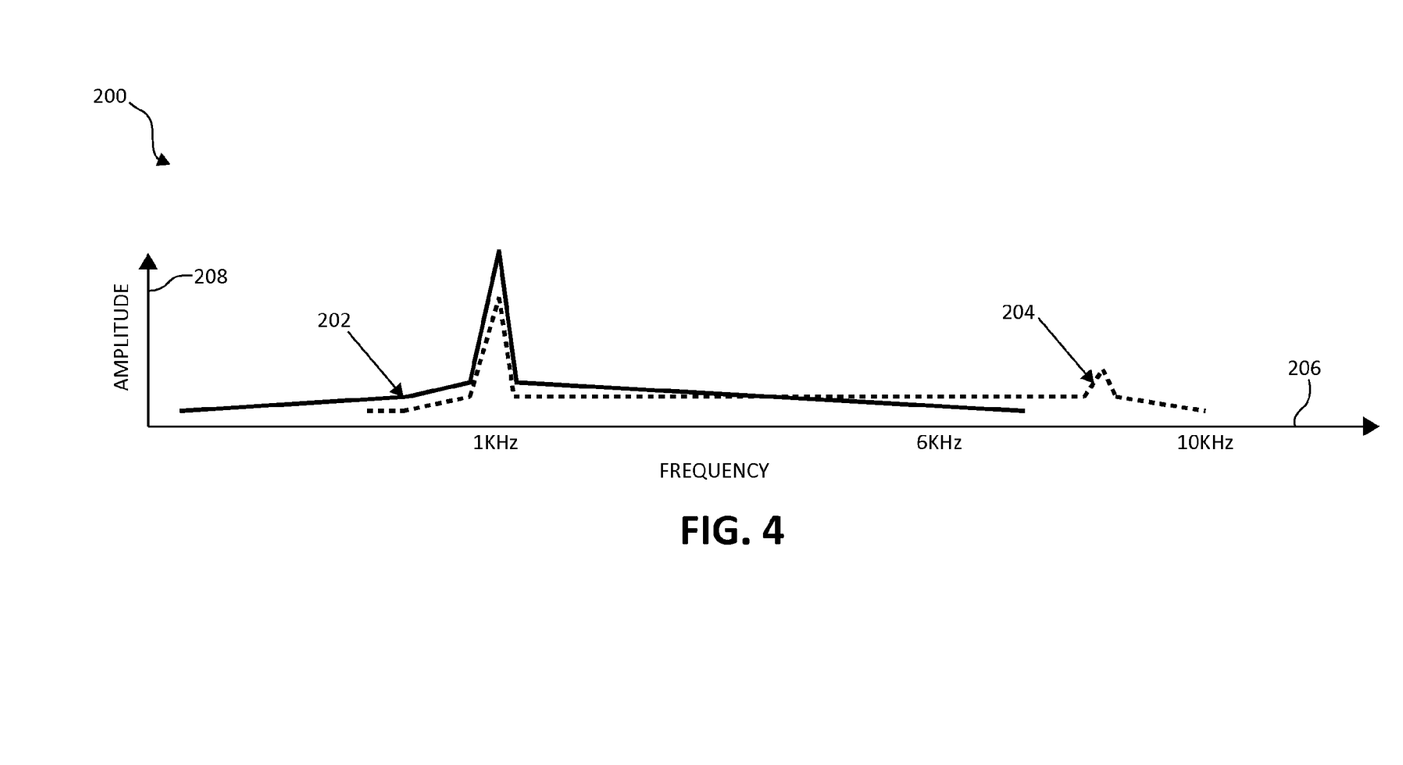
FIG. 4 illustrates a graphical representation of noise and/or vibrations detected from new and worn wheel bearings, in accordance with various embodiments.

With reference to FIG. 4 a graphical representation of vibrations in a wheel bearing are shown. Axis 208 may represent the amplitude of a vibration relative to the frequency, as represented by axis 206. The amplitude versus frequency plot for a normal bearing and a spent bearing is shown. Plot 202 illustrates an exemplary vibration of a normally operating bearing. The bearing may have an amplitude peak at a specific frequency (e.g., at 1 kHz) and have nominal vibration above 6 kHz. A bearing operating under normal conditions (i.e., with service life remaining until repair or replacement) may exhibit a repeatable vibration pattern (e.g., of plot 202).

In various embodiments, plot 204 may illustrate the vibration pattern of a worn bearing at the end of its service life. The peak vibration at approximately 1 kHz on plot 204 has smaller amplitude than the plot 202. As the bearing wears, the amplitude at predetermined frequencies may increase or reduce depending on the bearing failure signal. The changed amplitude signifies vibration due to bearing wear. The appearance of various resonant frequencies signifies increased vibration in the bearing. Thus, a system may be configured to monitor vibration at predetermined frequencies at which the amplitude changes as a bearing wears. As a monitored bearing begins to vibrate more like a spent bearing, the service life may be estimated based on the frequencies and amplitudes present.

Figure 5:
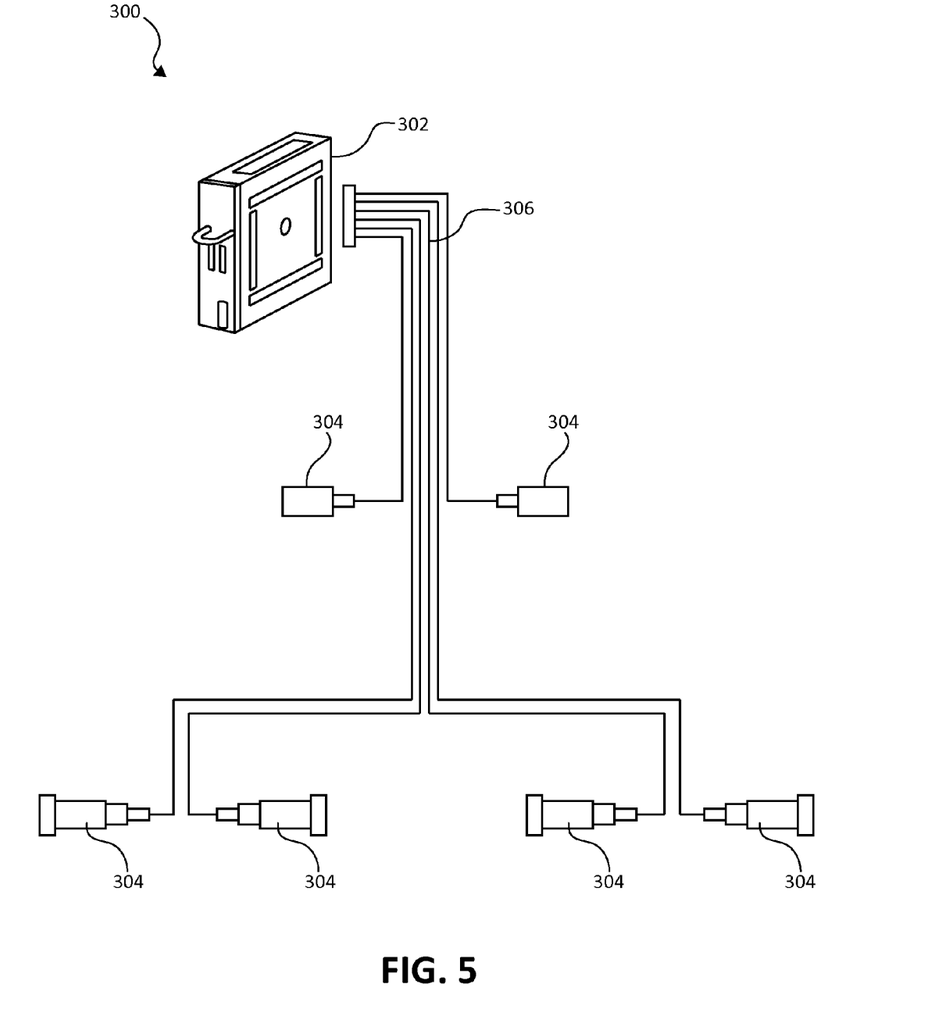
FIG. 5 illustrates a system for monitoring or measuring wheel bearing noise, in accordance with various embodiments.

FIG. 5 illustrates a system for monitoring or measuring wheel bearing vibration in an aircraft, in accordance with various embodiments. The system illustrates an aircraft with two wheels on each of three sets of landing gear, but other configurations are possible. The system includes a control unit 302 (e.g., a brake control unit or "BCU"). Control unit 302 may include a processor and a tangible, non-transitory memory and be capable of implementing logic. The processor may be a general purpose processor, a digital signal processor (DSP), an application specific integrated circuit (ASIC), a field programmable gate array (FPGA) or other programmable logic device, discrete gate or transistor logic, discrete hardware components, or any combination thereof. For example, control unit 302 may receive signals generated.

In various embodiments, each wheel on the nose gear includes wheel speed transducer (WST) 304 electrically coupled to control unit 302 by wires 306. The system also includes main gear components. Each main gear wheel may have a corresponding WST 304 also electrically coupled to control unit 302. The vibrations and temperatures in and around a wheel bearing may be measured by WST 304 and either processed locally at WST 304 or sent to control unit 302 for processing.

Figure 6:
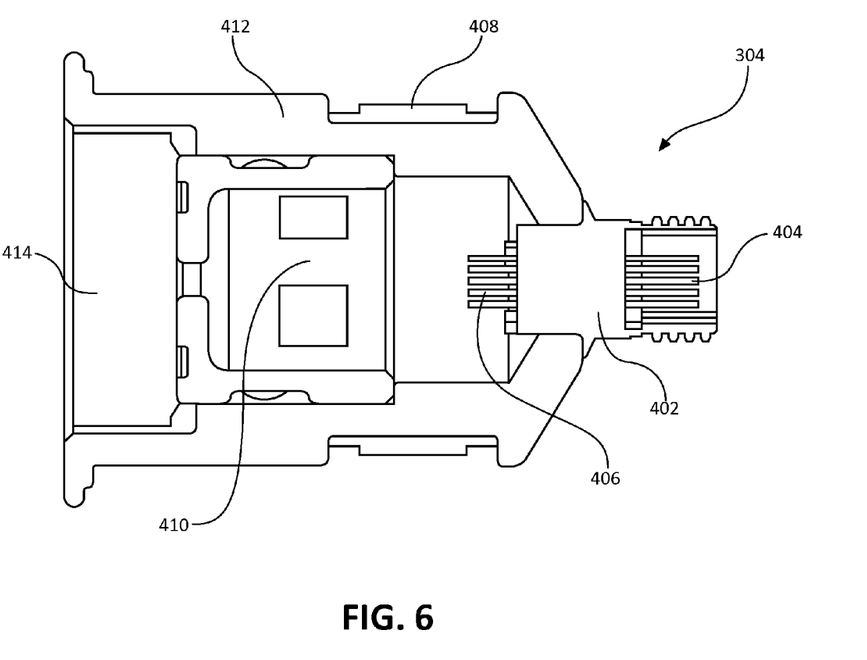
FIG. 6 illustrates an axel telemetry unit for use a wheel bearing to detect bearing failure, in accordance with various embodiments.

FIG. 6 illustrates an exemplary WST 304 for measuring wheel bearing status to communicate vibrations, speeds, and/or temperatures, in accordance with various embodiments. WST 304 includes connector 402. Connector 402 includes external pins 404 and internal pins 406. Internal pins are electrically connected to internal electronics. Internal electronics may include accelerometer and thermometer array 414 and may house electronic devices configured to measure vibrations and temperatures of nearby bearings. Accelerometer and thermometer array 414 may be disposed at any location within housing 412 and may make physical contact with housing 412. By pressing against housing 412, accelerometer and thermometer array 414 may be disposed close to the wheel bearing. In that regard, accelerometer and thermometer array 414 may be positioned to detect vibrations and temperatures of the wheel bearing. Accelerometer and thermometer array 414 may include a remote temperature sensor that makes contact with an axle at predetermined locations to determine axle temperature.

Figure 7:
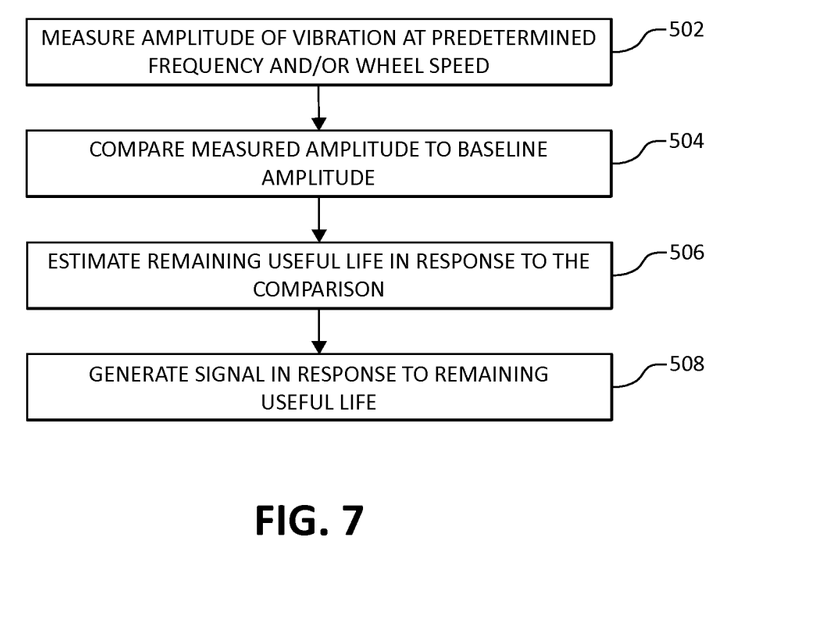
FIG. 7 illustrates a process for detecting worn wheel bearings, in accordance with various embodiments.

With reference to FIG. 7, process 500 of detecting worn bearings using control unit 302 and or WST 304 of system 300 in FIG. 5 is shown, in accordance with various embodiments. The system may detect worn bearings based on vibrations generated by the bearings. The amplitude of vibration is measured at a predetermined set of frequencies (Step 502). The amplitude of vibration may be measured at any number of predetermined frequencies to make a comparison to vibration data indicative of failure. In that regard, a non-transitory memory in communication with or incorporated into controller 302 may or WST 304 store one or more profiles comprising predetermined vibration profiles of failed bearings (e.g., amplitude and frequency values and/or spectra). A profile may also be taken when a bearing is new and bearing wear may be detected by comparing measured bearing vibration to the baseline profile of the new bearing. The profiles may include a method of detecting worn bearings based on a comparison to the profile.

In various embodiments, the system may compare the measured amplitude at the predetermined frequencies to a baseline amplitude at the predetermined frequencies (Step 504). For example, the predetermined frequencies may be 300 Hz, 700 Hz, 1 KHz, and 9 kHz. The measured amplitude may be 20% of the baseline amplitude at one of the predetermined frequencies. The smaller measured amplitude may indicate that the bearing has useful service life remaining.

In various embodiments, the system may estimate the remaining useful life in response to the comparison (Step 504). Continuing the above example, the bearing having an amplitude of 20% of the baseline amplitude may indicate that the bearing has more than half of its service life remaining according to previously performed and documented characterization testing. Thus, based on the measured amplitude, the system may estimate that the bearing has more than 50% of its service life remaining. The system may continue to monitor the bearing over time. At some point, the measured amplitude may indicate that the bearing may be due for service or replacement.

In various embodiments, system 300 may then generate a signal in response to the remaining useful life (Step 506). The signal may indicate that service is desirable or that service is unnecessary within some amount of time based on the estimated remaining useful life. Different types of bearings may have service lives lasting for various durations. Similarly, different frequencies and amplitudes may indicate failure in different types of bearings.

In various embodiments, the signal may be used to indicate to ground crews or flight crews that preventative maintenance may be appropriate. The repair signal may result in a warning displayed in cockpit, on a handheld device, or on a terminal to inform ground crews. The repair signal may also be displayed in avionics in the cockpit. In various embodiments, a worn bearing may still operate for some time, albeit with greater risk of failure than a new bearing. In that regard, maintenance may be delayed until the aircraft is at a convenient maintenance location to change the bearing. By detecting worn wheel bearings, system 300 may enable preventative maintenance or planned maintenance. Worn bearings may be replaced prior to complete failure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wheel monitoring system for a landing gear of an aircraft, comprising:
   a wheel;
   a bearing mechanically coupled to the wheel;
   an axle of the landing gear mechanically coupled to the bearing; and
   a vibration monitoring device disposed in the axle and comprising an accelerometer configured to detect vibrations of the bearing, wherein the vibration monitoring device is in electronic communication with a controller configured to determine a remaining useful life of the bearing in response to the vibrations of the bearing, wherein the vibration monitoring device comprises a wheel speed transducer (WST); and
   a non-transitory memory communicating with the controller, the non-transitory memory having instructions stored thereon that, in response to execution by the controller, cause the controller to perform operations comprising measuring, by the controller, the vibrations using the WST and measuring, by the controller, an amplitude of the vibrations at a predetermined frequency.

2. The wheel monitoring system of claim 1, wherein the operations further comprise generating a visual indicator in a cockpit or on a maintenance device in response to the remaining useful life of the bearing.

3. The wheel monitoring system of claim 1, wherein the operations further comprise:
   measuring, by the controller, a temperature of at least one of the bearing and the axle; and
   generating, by the controller, a signal on a maintenance device or in a cockpit in response to the temperature measured by the controller.

4. The wheel monitoring system of claim 1, wherein the operations further comprise outputting the remaining useful life of the bearing.

5. A method of monitoring a bearing of a wheel on an aircraft, comprising:
   measuring a vibration of the bearing using a wheel speed transducer;
   comparing the vibration of the bearing measured by the wheel speed transducer to at least one of a predetermined value or spectra indicative of bearing wear; and
   estimating a remaining useful life of the bearing based on a result of the comparing the vibration of the bearing to at least one of the predetermined value or the spectra.

6. The method of claim 5, wherein measuring the vibration of the bearing further comprises measuring an amplitude at a predetermined frequency.

7. The method of claim 6, further comprising comparing the amplitude at the predetermined frequency to a baseline amplitude at the predetermined frequency.

8. The method of claim 7, wherein the baseline amplitude at the predetermined frequency is representative of a spent bearing.

9. The method of claim 7, wherein the baseline amplitude at the predetermined frequency is representative of a new bearing.

10. The method of claim 5, further comprising measuring a temperature of the bearing.

11. The method of claim 5, wherein measuring the vibration of the bearing further comprises measuring the vibration of the bearing using an accelerometer.

* * * * *